April 25, 1944.   E. H. BERNO   2,347,239
BRAKE MECHANISM
Filed Jan. 3, 1941   2 Sheets-Sheet 2
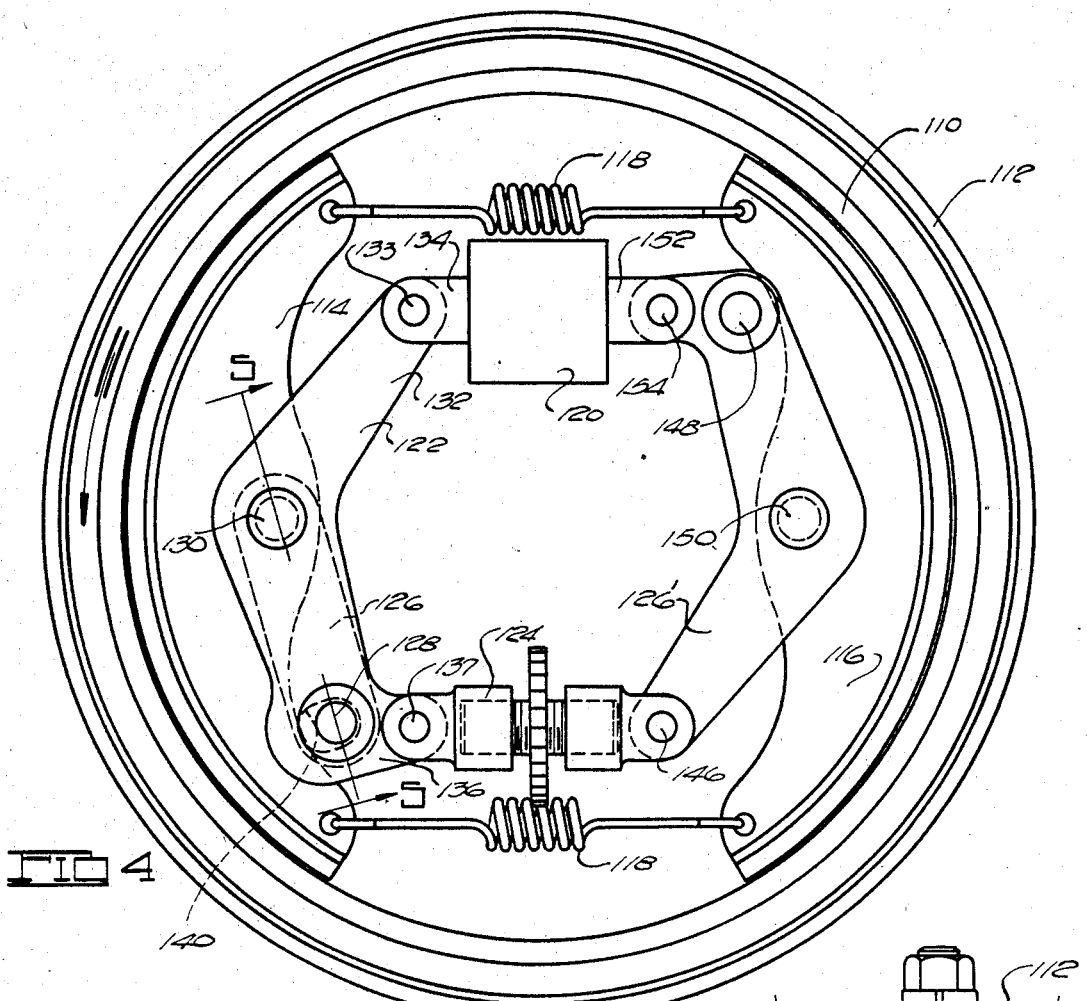
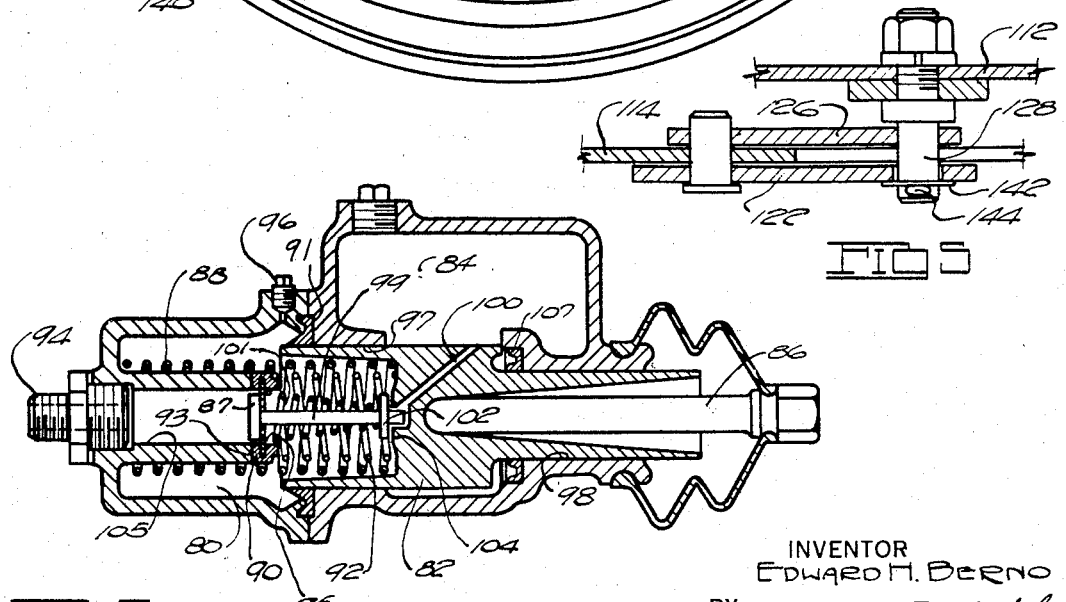
INVENTOR
EDWARD H. BERNO
BY Edwin J. Balluff
ATTORNEY Patented Apr. 25, 1944

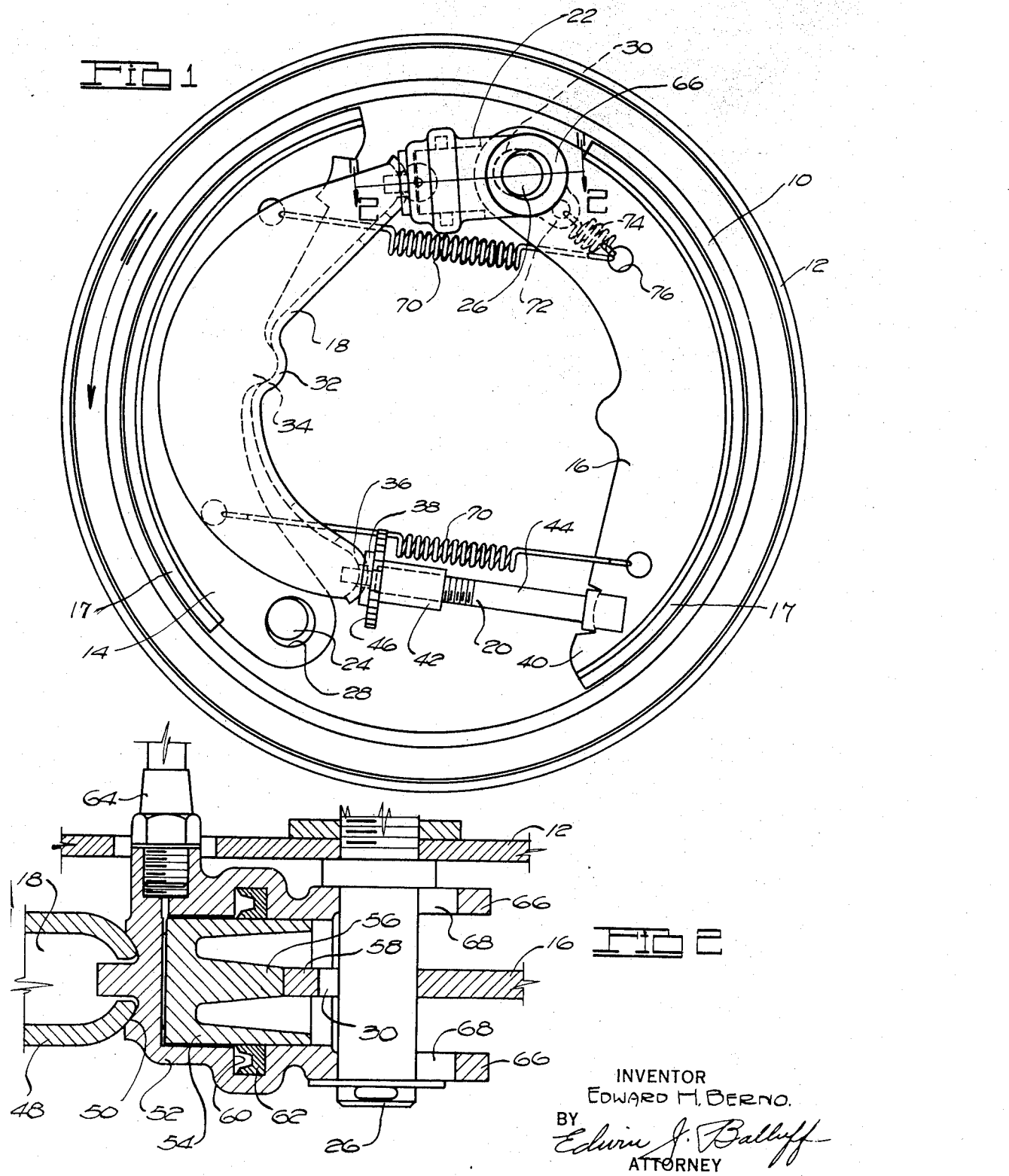

2,347,239

UNITED STATES PATENT OFFICE 2,347,239

BRAKE MECHANISM

Edward H. Berno, Plymouth, Mich.

Application January 3, 1941, Serial No. 373,017

10 Claims. (Cl. 188—152)

This invention relates to brake mechanism and has particular reference to wheel brake structure particularly adapted although not limited for use in wheel brakes of automotive vehicles.

A principal object of my invention is to provide a novel and improved form of brake mechanism which is simpler in construction, more efficient in operation, more dependable in operation, and which is designed and constructed in such a manner as to make the installation and servicing thereof comparatively simple.

Another object of my invention is to provide a novel and improved form of cylinder and piston construction which may be used both in the master cylinder and in the wheel brake cylinders of a hydraulic braking system, such as that illustrated herein.

Another object of my invention is to provide a new and improved form of master cylinder construction for hydraulic brake systems.

Other objects and advantages of my invention will be apparent from consideration of the following specification taken in conjunction with the accompanying drawings, of which there are two sheets, and wherein:

Fig. 1 is an elevational view of a wheel brake mechanism embodying one form of my invention;

Fig. 2 is a sectional view taken in a plane along the line 2—2 of Fig. 1;

Fig. 3 is a view, partly in section, of a master cylinder construction embodying my invention;

Fig. 4 is an elevational view of a modified form of a wheel brake mechanism embodying my invention; and Fig. 5 is a section taken in a plane along the line 5—5 of Fig. 4.

Referring now to Figs. 1 and 2, there is illustrated a wheel brake assembly of a motor vehicle and which, as shown, consists of a conventional brake drum 10 which is rotatable with a road wheel of the vehicle, a backing plate 12 which is non-rotatably supported by the vehicle chassis, a pair of brake shoes 14 and 16, an actuating link or lever 18, an adjustable link 20, a wheel cylinder and piston assembly 22, and a pair of anchor pins 24 and 26. The anchor pins 24 and 26 are rigidly secured to the backing plate 12, as illustrated in Fig. 2 in connection with pin 26, for taking the braking torque of the shoes 14 and 16. The shoe 14 is provided with an enlarged hole or slot 28 in one end thereof and through which the pin 24 extends for taking the torque of the shoe 14 upon braking when the drum 10 is rotating in the direction indicated by the arrow in Fig. 1. The shoe 16 likewise is provided with an enlarged hole or slot 30 in one end thereof and through which the anchor pin 26 extends for taking the torque of the shoe 16 when the drum 10 is rotating in the direction indicated by the arrow in Fig. 1. The link or actuating lever 18 is connected at its center 32 to the center 34 of the shoe 14, the shoe being provided with a rounded lug which seats in a complementary shaped socket formed in the link 18 so that braking effort applied to the shoe will be applied radially and at the center of the shoe thereby obtaining substantially uniform pressure between the drum and the brake lining carried by the shoe 14 and throughout the entire extent of the lining. The shoe 16, assembly 22, and links 18 and 20 comprise links or parts of a linkage system for applying the brakes. The shoes 14 and 16 each are provided with brake lining 17 for "braking movement of the drum". The shoes 14 and 16, due to the manner in which they are connected to the supporting plate 12, are floating shoes.

The expression "drum braking means" as used in the claims necessarily includes the brake lining and in some cases also includes the brake shoe to which the lining is affixed.

One end 36 of the link 18 is seated against one end 38 of the adjusting link 20 and the other end of the adjusting link 20 is shaped so as to seat in a notch formed in one end 40 of the shoe 16. The adjusting link 20 comprises two parts 42 and 44 which are threadedly secured together so that the length of the link 20 may be adjusted, which, when the link 20 is assembled as illustrated in Fig. 1, may be accomplished by turning the notched wheel 46 formed on the part 42. The other end 48 of the link 18 is seated in a seat 50 provided at one end of a floating cylinder 52.

The floating cylinder 52 comprises a part of the wheel brake cylinder and piston assembly 22 which further includes a piston 54 mounted for reciprocation within the bore of the cylinder 52. The rear end 56 of the piston is shaped so as to form a seat for the end 58 of the brake shoe 16. The bore of the cylinder 52 is relieved by an annular groove 60 in which a U-shaped annular resilient gasket 62 is arranged so as to provide a seal between the piston 54 and the cylinder 52. The groove 60 is somewhat larger in cross section than the gasket 62 and the open side of the gasket is so arranged as to be open toward the pressure side of the cylinder. In this manner fluid under pressure admitted into the cylinder through the connection 64 will act on the gasket 62 so as to force the sides thereof into sealing contact both with the outer wall of the piston and with the inner wall of the groove and will also effect relative movement between the piston 54 and the cylinder 52 for applying pressure to the brake shoes.

The cylinder 52 is bifurcated to form arms 66 in which aligned slots 68 are provided. As will be observed, the arms 66 straddle the end 58 of the shoe 16 and the pin 26 extends through the slots 68 in the arms 66 as well as through the slot 30 in the shoe 16. Springs 70 connected to the shoes 14 and 16 serve to maintain the brake shoes away from the drum 10 when there is no pressure in the fluid system. One of the arms 66 is provided with an eye 72 and a spring 74 connected at one end thereof to the eye 72 and at the other end thereof to an opening 76 in the shoe 16 serves to hold the cylinder and piston assembly 22 and the brake shoe 16 in the position illustrated in Fig. 2 with respect to the pin 26 when the system is at rest. During rotation of the drum 10 in the direction indicated by the arrow in Fig. 1 and upon application of pressure to the fluid in the cylinder and piston assembly 22, the piston 54 and cylinder 52 will move relative to each other until the shoes 14 and 16 come into contact with the rotating drum whereupon, due to rotation of the drum, the end 58 of the shoe 16 will seat against the pin 26 as illustrated in Fig. 2. The relative movement between the cylinder and piston will result in the application of pressure to the end 48 of the link 18. As soon as the shoe 14 comes in contact with the drum the other end 36 of the link 18 will transmit through the link 20 and to the end 40 of the shoe 16 a force equal to that applied to the end 48 of the link 18 by the cylinder 52. The pin 24 will take the braking torque of the shoe 14 while the pin 26 will take the braking torque of the shoe 16. The braking pressure and effect of each of the shoes will be the same. When the drum is rotating in the opposite direction, the braking torque of both shoes will be taken by the anchor pin 26.

Fluid under pressure may be supplied to the wheel cylinder and piston assembly through the connection 64 from a master cylinder, such as that illustrated in Fig. 3, the construction of which comprises a cylinder 80, a piston 82, a fluid reservoir 84, a piston actuating rod 86, a spring 88 for returning the piston to its retracted position, a rubber or non-metallic valve member 90, a spring 92 for biasing the valve member 90 to its seat 93, a coupling member 94 to which connection 64 is connected by tubing, a bleed 96, valve members 87, 95, and 102, and valve spring 101. Valve seat 93 comprises an annular face formed on the end of the cylindrical boss 105, and when annular valve member 90 is seated thereon the fluid inside of boss 105 is separated from the fluid in cylinder 80, except as hereinafter noted. Valve member 90 carries an apertured wall or partition which forms another valve member 95 cooperating with which is a valve member 87 carried by one end of stem 99 which extends through the apertured valve member 95. On the other end of stem 99, valve member 102 is provided which is adapted to cooperate with valve seat 104 for closing communication through duct 100 between the reservoir 84 and cylinder 80.

The interior of the boss 105 communicates with coupling member 94 which leads to the wheel cylinders. Valve members 87 and 95 normally are held seated by spring 101 which is confined between valve members 102 and 95. Valve 90, 93 normally is held closed by spring 92 but will open to permit return of fluid from the lines to the cylinder whenever the pressure in the lines is greater than the pressure of spring 92.

The piston 82 is slidably mounted in cylindrical bearing surfaces 97 and 98 and U-shaped annular resilient gasket 91 arranged in an annular groove in the cylinder 80 and around the piston 82 is adapted to provide a seal between the piston 82 and the cylinder 80 upon relative movement therebetween. Another gasket 107 arranged around a part of the piston 82 may be provided to seal the joint between the piston and the casing which forms the reservoir 84. Normally the wheel cylinders, of which there is one for each wheel brake assembly, and the connection between the same and the master cylinder, and the master cylinder are maintained full of fluid, such as a liquid. When the piston 82 is in its retracted position the duct 100 is open but when the piston 82 moves a little to the left of the position in which it is illustrated in Fig. 3, valve member 102 is adapted to cooperate with the seat 104 formed on the piston 82 to close the duct 100. Further movement of the piston 82 to the left will open valve 87, 95 and subject the fluid in the cylinder, in the connections to the wheel brake cylinders, and in the wheel brake cylinders, to pressure for the purpose of effecting the application of the brakes. The gasket 91 is arranged relative to the piston 82 and the cylinder 80 so that upon application of pressure to the fluid in the cylinder 80 the side walls of the gasket will be forced into sealing engagement with the adjacent walls of the cylinder and of the piston. The rod 86 may be arranged to be actuated by a conventional foot brake pedal.

Referring now to Figs. 4 and 5, there is illustrated a modified form of construction which comprises a backing plate 112, a conventional drum 110, a pair of brake shoes 114 and 116, springs 118 for holding the same in a retracted position, a wheel cylinder and piston assembly 120, and a series of links 122, 124, and 126' which are arranged for actuating the shoes 114 and 116 and connected to the wheel cylinder and piston assembly or link 120 for actuation thereby. The shoe 114 has pivotally connected to the center 130 thereof one end of a link 126, the other end of which is pivotally mounted upon an anchor pin 128 carried by the backing plate 112. The link 122 at its center is also connected at 130 to the center of the shoe 114 for applying pressure thereto. One end 132 of the link 122 is pivotally connected at 133 to an arm 134 provided on the cylinder of the wheel cylinder and piston assembly 120, while the other end 136 of link 122 is pivotally connected at 137 to one end of the link 124. The link 122 is provided with a slot 140 through which the pin 128 extends, the slot 140 being of sufficient size so as to permit unrestricted movement of the link 122 by the wheel cylinder and piston assembly. The pin 128 may carry a collar 142 (Fig. 5) secured in place by a cotter pin 144 for securing the assembly to the backing plate 112. The other end of the link 124 which is of adjustable length is pivotally connected at 146 to one end of the link 126'. The link 126' is pivotally secured to an anchor pin 148 carried by the backing plate and at 150, which is the center of the link 126', the same is pivotally connected to the center of the brake shoe 116. The anchor pin 148 thereby takes the braking torque of the braking shoe 116.

A piston of the wheel cylinder and piston assembly is provided with an arm 152 which is pivotally connected at 154 to one end of the link 126' so that the anchor pin 148 takes the reaction of the wheel cylinder and piston assembly upon application of the brakes. The construction of the wheel cylinder and piston assembly may be of any desired design and hence has been shown somewhat diagrammatically. When the drum 110 is rotated in the direction indicated by the arrow in Fig. 4, operation of the wheel cylinder and piston assembly 120 will expand the linkage 122, 124, and 126' and will thereby move the shoes 114 and 116 into operative engagement with the drum 110. Due to the arrangement of the linkage with respect to the anchor pins 128 and 148 and the manner in which the linkage is connected to the brake shoes, the same amount of braking force will be exerted by each shoe whether the drum is rotating forwardly or reversely.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. Brake mechanism comprising a drum, a backing plate, an anchor pin carried thereby, a pair of links each of which is secured to said anchor pin in such a manner as to have a limited sliding movement relative thereto, drum braking means operatively associated with one end of one of said links so as to be actuated thereby, a connection between said drum braking means and the free end of the other of said links, drum braking means operatively associated with said other of said links, one of said links comprising a cylinder and piston assembly including a cylinder member and a piston member, one of said members being arranged relative to said other of said links so as to move therewith and the other of said members having a pin and slot connection with said anchor pin and being arranged between said pin and said first mentioned drum braking means.

2. Brake mechanism comprising a drum, a backing plate, an anchor pin carried thereby, a cylinder and piston assembly comprising a piston member and a cylinder member, one of said members being secured to said pin in such a manner as to have a limited sliding movement relative thereto and the other of said members being arranged between said pin and said one of said members, drum braking means operatively associated with one of said members so as to be actuated thereby and other drum braking means connected to the aforesaid drum braking means and to the other of said members so as to be actuated thereby.

3. Brake mechanism comprising a drum, a backing plate, an anchor pin carried thereby, a cylinder and piston assembly comprising a piston member and a cylinder member, one of said members being secured to said pin in such a manner as to have a limited sliding movement relative thereto and the other of said members being arranged between said pin and said one of said members, drum braking means operatively associated with one of said members so as to be actuated thereby and other drum braking means connected to the aforesaid drum braking means and to the other of said members so as to be actuated thereby, said other drum braking means having a seat adapted to engage and be seated against said anchor pin during braking in one direction of rotation of said drum.

4. Brake mechanism comprising a brake drum, a backing plate, a pair of links, each of which is anchored to said pin in such a manner as to have a limited sliding movement relative thereto, a lever, one end of which is pivotally connected to one end of one of said links, a connection between the other end of said lever and the free end of the other of said links, said other of said links having drum braking means operatively associated therewith, and other drum braking means operatively associated with said lever so as to be actuated thereby, one of said links being extensible for moving said drum braking means into operative engagement with said drum.

5. Wheel brake structure comprising a brake drum, a supporting plate, an anchor pin carried by said plate, a plurality of links connected together, one of which includes a brake shoe, one of which is pivotally connected at its center to a second brake shoe and another of which links is extensible for moving said shoes into operative engagement with said brake drum, said extensible link being arranged between said pin and one end of said second mentioned link, and having a pin and slot connection with said anchor pin.

6. Wheel brake structure comprising a drum, a backing plate, an anchor carried by said plate, an extensible link comprising a hydraulic cylinder and piston assembly having one end thereof pivotally connected to said anchor, a lever pivotally connected at one end thereof to the other end of said extensible link, a second link having a pivotal connection at one end thereof with said anchor and connected at the other end thereof to the other end of said lever, drum braking means operatively associated with said second link, and other drum braking means comprising a brake shoe having a pivotal connection at the center thereof with the center of said lever, a second anchor carried by said plate and a connection between said anchor and said shoe which permits movement of said shoe into and out of engagement with said drum and which transmits the braking torque of said shoe to said second anchor.

7. Wheel brake structure comprising a drum, a backing plate, an anchor carried by said plate, an extensible link comprising a hydraulic cylinder and piston assembly having one end thereof pivotally connected to said anchor, a lever pivotally connected at one end thereof to the other end of said extensible link, a second link having a pivotal connection at one end thereof with said anchor and connected at the other end thereof to the other end of said lever, drum braking means operatively associated with said second link, and other drum braking means comprising a brake shoe having a pivotal connection at the center thereof with the center of said lever, said shoe having an aperture in one end thereof and a second anchor carried by said plate and having a loose fit in said aperture for taking the torque of said shoe.

8. Wheel brake structure comprising a drum, a backing plate, an anchor carried by said plate, an extensible link comprising a hydraulic cylinder and piston assembly having one end thereof pivotally connected to said anchor, a lever pivotally connected at one end thereof to the other end of said extensible link, a second link having a pivotal connection at one end thereof with said anchor and connected at the other end thereof to the other end of said lever, drum braking means operatively associated with said second link, and other drum braking means comprising a brake shoe having a pivotal connection at the center thereof with the center of said lever, a second anchor carried by said plate and a link pivotally connected at one end thereof to the center of said shoe and at the other end thereof to said second anchor.

9. Wheel brake structure comprising a drum, a backing plate, an anchor carried by said plate, an extensible link comprising a hydraulic cylinder and piston assembly having a cylinder member and a piston member, one of said members being connected to said anchor in such a manner as to have a limited sliding movement relative thereto, the other of said members being arranged between said anchor and said one of said members, a lever pivotally connected at one end thereof to said one of said members, a second link having a pivotal connection at one end thereof with said anchor and connected at the other end thereof to the other end of said lever, drum braking means operatively associated with said second link and other drum braking means comprising a brake shoe having a pivotal connection at the center thereof with the center of said lever.

10. Wheel brake structure comprising a drum, a backing plate, an anchor carried by said plate, an extensible link comprising a hydraulic cylinder and piston assembly having a cylinder member and a piston member, one of said members being connected to said anchor in such a manner as to have a limited sliding movement relative thereto, the other of said members being arranged between said anchor and said one of said members, a lever pivotally connected at one end thereof to said one of said members, a second link having a pivotal connection at one end thereof with said anchor and connected at the other end thereof to the other end of said lever, drum braking means operatively associated with said second link and other drum braking means comprising a brake shoe having a pivotal connection at the center thereof with the center of said lever, said second link being pivoted to said anchor in such a manner as to have a limited sliding movement relative thereto and being arranged relative to said other of said members so as to move therewith.

EDWARD H. BERNO.